No. 713,633. Patented Nov. 18, 1902.
A. E. HALL.
FISHING REEL.
(Application filed Jan. 10, 1902.)
(No Model.) 2 Sheets—Sheet 1.

Witnesses
T. W. Riley,
B. L. Funk

Inventor
Allen E. Hall,
By Victor J. Evans
Attorney

THE NORRIS PETERS CO., PHOTO-LITHO., WASHINGTON, D. C.

No. 713,633. Patented Nov. 18, 1902.
A. E. HALL.
FISHING REEL.
(Application filed Jan. 10, 1902.)
(No Model.) 2 Sheets—Sheet 2.
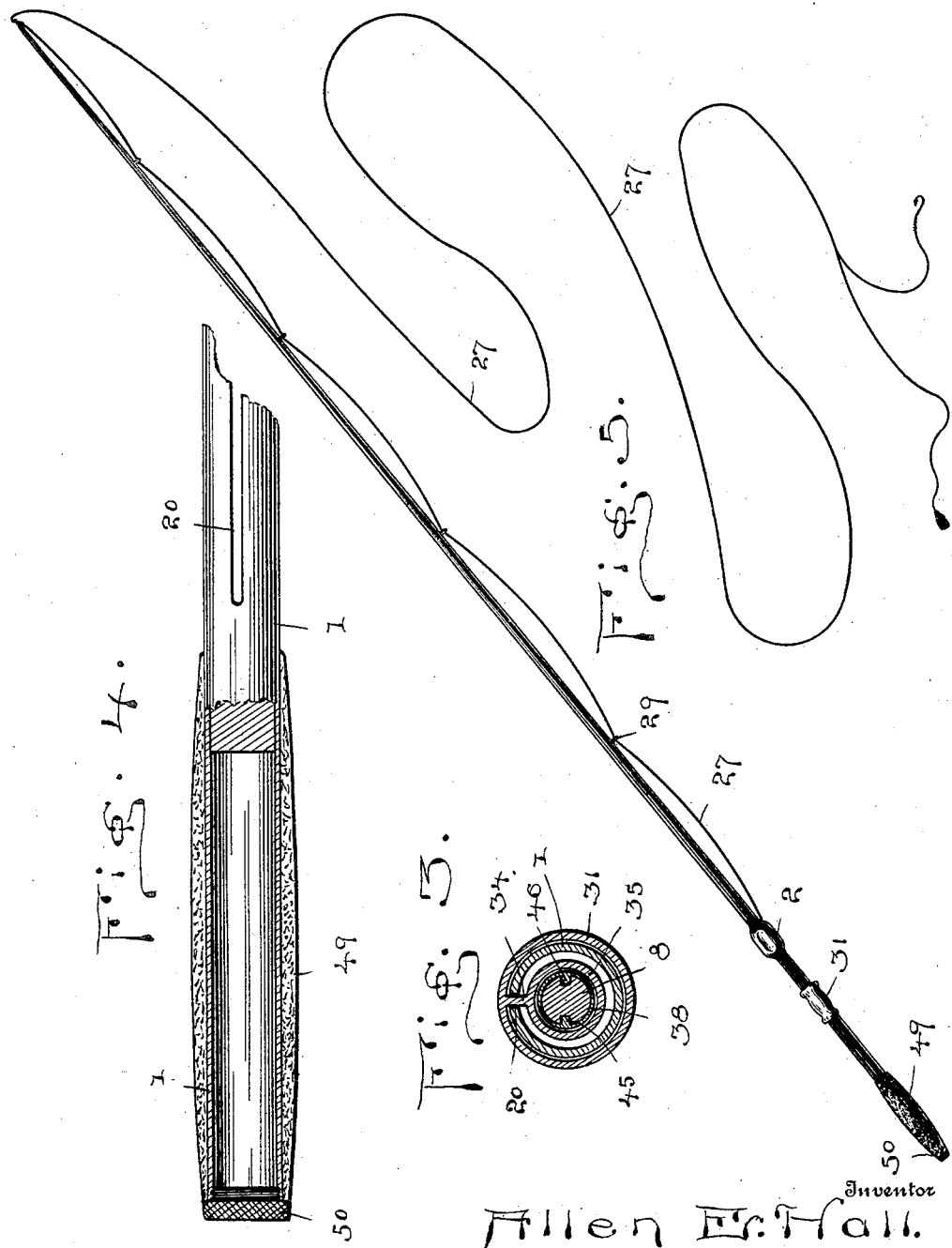

UNITED STATES PATENT OFFICE.

ALLEN E. HALL, OF ATLANTIC CITY, NEW JERSEY.

FISHING-REEL.

SPECIFICATION forming part of Letters Patent No. 713,633, dated November 18, 1902.

Application filed January 10, 1902. Serial No. 89,174. (No model.)

*To all whom it may concern:*

Be it known that I, ALLEN E. HALL, a citizen of the United States, residing at Atlantic City, in the county of Atlantic and State of New Jersey, have invented new and useful Improvements in Fishing-Reels, of which the following is a specification.

This invention relates to fishing-reels; and the primary object thereof is to provide a cheap, durable, and efficient device which may be conveniently and expeditiously operated to wind and release the line as the fish is being played.

The peculiar manner of accomplishing the desired result will be specifically described hereinafter, and the novel arrangement of parts and combinations of parts may be readily understood by reference to the accompanying drawings, forming a part of this specification, and in which—

Figure 1:
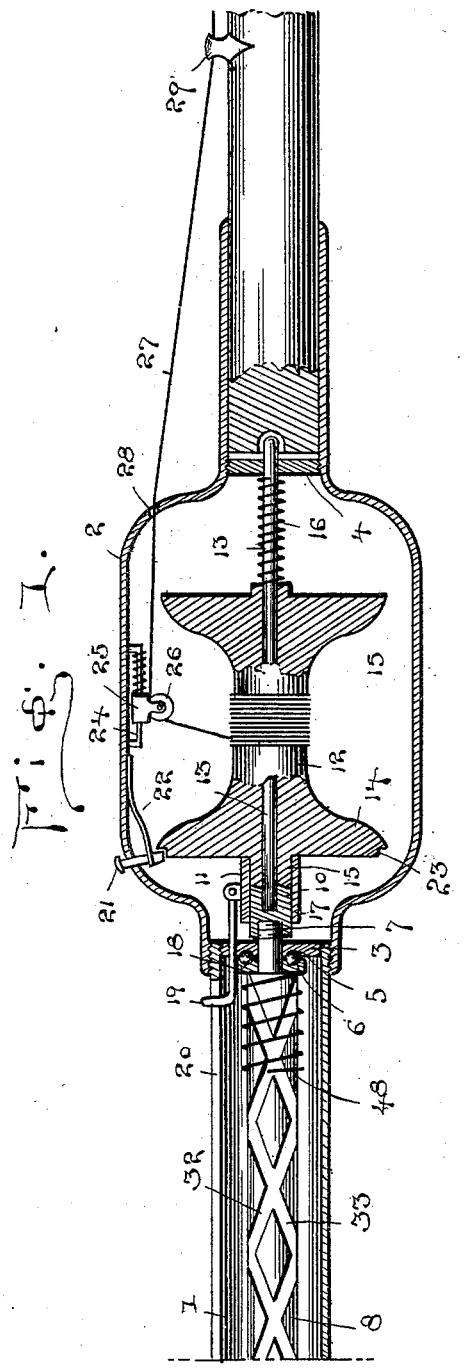
Figure 2:
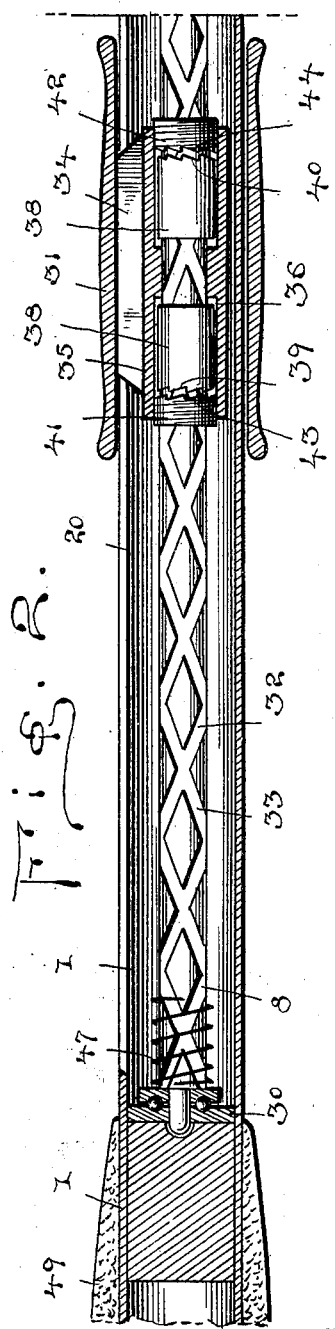

Figure 1 is a longitudinal sectional view through a rod to which the reel is applied, part of the mechanism being shown in elevation. Fig. 2 is a similar view of an additional portion of the rod, showing the operating-shaft. Fig. 3 is a transverse sectional view on the line 3 3 of Fig. 2. Fig. 4 is a longitudinal view of the butt of the rod, part of which is shown in section and part in elevation; and Fig. 5 is a perspective view of the device ready for use.

The reference-numeral 1 designates a rod, hollow for a portion of its length and provided near the butt-end thereof with an enlarged casing 2, in which the reel 3 is contained. At the respective ends of the casing 2 are suitable bearings 3 and 4. The bearing 3 comprises a disk provided on one face with a suitable raceway 5, in which are provided anti-friction-bearings 6, and in this bearing is journaled the reduced end 7 of the operating-shaft 8. It will be noticed that this shaft is greater in diameter than the opening in the bearing 3 and that by forming the reduced extension 7 a shoulder is formed on the end of the shaft in which is a raceway 9, corresponding to the raceway 5, above described and which is parallel therewith, whereby the bearings are securely held in place. Extending from the free end of the reduced extension 7 is an enlarged head 10, provided on its face with ratchets 11, to be referred to hereinafter.

In order that the spool 12 of the reel may be supported within the casing, I provide a longitudinally-extending shaft or axle 13, one end of which is journaled in the head 10 and the other end in the bearing 4. The spool is revolubly secured upon the shaft and is provided at its ends with circumferential flanges 14 and 15 to guide the line thereon. Projecting from the end 14 is a ratcheted collar 15, which is provided with ratchets to correspond with those on the head 10. Bearing against the opposite end of the spool is a coil-spring 16, the convolutes of which surround the shaft 13 and the ends of which bear against the bearing 4 and the flange 15 of said spool, whereby the normal tendency thereof is to force the spool in engagement with the ratcheted-head 10 and hold them in engagement, whereby the spool may be driven by the shaft 8. By reference to Fig. 1 it will be noticed that a tubular clutch (designated by the reference-numeral 17) surrounds the head 10 and the extension 15, so that by sliding the reciprocating rod 18 forward the spool will be thrown out of engagement with the operating rod or shaft. This rod 18 is provided on its free end with an upwardly-projecting finger 19, which slides through a slot 20 in the rod 1, whereby the clutch may be readily operated. In order to control the speed of the spool, I provide a brake 21, which is mounted in the casing 2 and is normally held out of engagement with the flange 14 of said spool through the medium of a spring 22. By pressing upon the brake 21 it will be forced into engagement with the circumferential groove or cut-out portion 23, arranged on the periphery of the flange 14, and the speed of the spool will thereby be materially retarded and the resistance offered to the fish will materially assist the angler in tiring him.

Arranged at a convenient point above the spool is a bracket 24, provided with a longitudinally-extended rod, on which is a spring-pressed hanger 25, carrying a pulley 26. The line 27 is preferably passed over the pulley from the spool, thence through an opening 28 in the forward end of the casing, and finally fed through guides 29 of any preferred construction, which are arranged in the ordinary manner upon a rod. The operating-shaft 8 is also journaled in suitable antifriction-bearings 30, near the butt of the rod, and is adapted to be rotated continuously in one direction through the medium of a reciprocating sleeve 31, which is adapted to be grasped by the operator with one hand and slid rapidly back and forth upon the rod 1. By reference to Fig. 4 it will be noticed that the rod 8 is provided with oppositely-disposed spiral grooves 32 and 33 in a manner similar to the rods heretofore used for screw-drivers and the like. The sleeve 31 is provided with an inwardly-arranged rib or blade 34, to which is rigidly secured an inner tubular sleeve 35, provided with an intermediate inner annular rib 36, forming shoulders, which are adapted to abut against the inner ends of the sleeves 38 and 38ª, which are loosely mounted on the rod 8 and are provided with ratchet-faces 39 and 40 to engage the ratchets 41 and 42, which are rigidly fastened with relation to the sleeve 35 and in the respective ends thereof. Inwardly-extending projections 45 and 46 are arranged diametrically opposite each other and secured rigid with relation to the tubular sleeves 38, whereby they may engage the grooves 32 and 33 of the driving-shaft 8. When the sleeve 31 is drawn toward the butt of the rod, the ratchets 39 will engage on the nut or plug 41 through the medium of the projections 45 and 46 and the said shaft will be rotated. When the sleeve reaches the limit of its movement rearwardly, the operator will reverse its direction of movement by causing it to travel toward the tip of the rod. This will release the sleeves 38 and 38ª from engagement with the nut 41 and will throw the ratchet 40 in engagement with the ratchet 44 of the nut 42, causing the continuation of the rotation of the shaft 8. By rapidly moving the sleeve 31 in a reciprocating manner on the rod 1 a continuous rotation of the shaft 8 will ensue, causing the spool to wind the line rapidly.

In order to obviate any unnecessary wear upon the parts due to vibration of the sleeve 1 in striking against the bearings at the limit of its movement, I provide buffers 47 and 48 at the extreme ends of the driving-shafts 8, which consist of coil-springs surrounding said shaft and which are adapted to diminish the impact upon the bearings.

49 designates the hand-grip at the extreme butt-end of the rod, which consists of a hollow cylindrical tube, the end of which is closed by a screw-cap 50. The interior of this grip may be readily used for hooks, flies, spoons, or other tackle forming a part of a fisherman's outfit.

From the foregoing it will be apparent that this device may be used for any purpose and meet any demands which are required of a device of this kind. If, for instance, it is desired to use the device for fly-casting, the rod 18 may be pushed forward, and through the medium of the clutch 17 the spool will be thrown out of gear with the driving-rod 8. The line may then be readily removed from the spool. By pressing upon the brake 21 the removal of the line will be instantly stopped. In the event of a "strike" and should the fish take flight the operator may retard the removal of the line by pressing upon the brake 21, which will form an effective means for tiring the fish. By permitting the rod 18 to slide rearward the spring 16 will automatically throw the spool in engagement with the driving-rod 8, so that the operator may immediately rewind the line to draw in the fish.

It will be seen that I have provided a cheap, durable, and efficient reel which will readily perform the services for which it is intended, and while I have specifically described what to me at this time appears to be the best means of accomplishing the desired result I would have it understood that I do not limit myself to the exact details of construction shown, but reserve the right to make such slight changes and alterations as would suggest themselves from time to time and without departing from the spirit of this invention.

Having thus fully described my invention, what I claim, and desire to secure by Letters Patent, is—

1. A fishing-reel comprising a reciprocating handpiece, a rotatable shaft to be actuated by the handpiece, a reduced extension on the shaft forming an axle, a spool loosely mounted on the axle, ratchets on the spool and on the shaft, and a coil-spring surrounding the axle and pressing against the spool to normally connect the spool and shaft together, whereby the rotation of the shaft will rotate the spool.

2. A fishing-reel comprising a reciprocating handpiece, a rotatable shaft to be actuated by the handpiece, a reduced extension on the shaft forming an axle, a spool loosely mounted on the axle, ratchets on the spool and on the shaft, and a coil-spring surrounding the axle and pressing against the spool to normally connect the spool and shaft together, whereby rotation of the shaft will rotate the spool and a clutch for releasing the spool from contact with the shaft.

3. A reel comprising a rotatable spool having a peripheral shoulder, means for actuating said spool, a spring-pressed pulley arranged above the spool, a line wound on the spool and passing over the pulley, and a spring-brake adapted to engage a shoulder on the spool.

In testimony whereof I affix my signature in presence of two witnesses.

ALLEN E. HALL.

Witnesses:
EDWIN ROBART,
GEO. P. SUTTON.